United States Patent [19]
Eckhart

[11] 3,937,527
[45] Feb. 10, 1976

[54] FLUID PRESSURE RELAY VALVE

[75] Inventor: Alfred Eckhart, Munich, Germany

[73] Assignee: Knorr-Bremse GmbH, Munich, Germany

[22] Filed: Sept. 16, 1974

[21] Appl. No.: 505,959

[30] Foreign Application Priority Data
Apr. 22, 1974 Germany............................ 2419243
May 25, 1974 Germany............................ 2425449

[52] U.S. Cl. ................................. 303/40; 303/21 F
[51] Int. Cl.² ........................................ B60T 15/20
[58] Field of Search............ 303/21 F, 21 S, 21 RM, 303/29, 40, 3, 15

[56] References Cited
UNITED STATES PATENTS

| | | | |
|---|---|---|---|
| 3,411,836 | 11/1968 | Dobrikin et al. ...................... | 303/40 |
| 3,443,839 | 5/1969 | Hinrichs et al. ................... | 303/40 X |
| 3,758,167 | 9/1973 | Machek ............................ | 303/40 X |

Primary Examiner—Duane A. Reger
Attorney, Agent, or Firm—Edmund M. Jaskiewicz

[57] ABSTRACT

A fluid pressure relay valve particularly for the electro-pneumatic control of vehicle brakes has a piston displaceable within a valve housing to define a control chamber on one side of the piston and on the other side of the piston there is a second chamber which is connected to the braking device. The pressure within the control chamber is controlled by inlet and outlet solenoid valves. The piston actuates valve means for controlling the pressure in the second chamber by venting the chamber or by connecting the chamber to a source of fluid pressure. An additional volume of pressure medium is connected to the control chamber for the purpose of increasing the pressure in the control chamber subsequently to the release of the signal "hold the pressure." The increase in pressure is to a predetermined level which is a function of a controlled lowering of pressure in the additional volume.

8 Claims, 4 Drawing Figures

FLUID PRESSURE RELAY VALVE

The present invention relates to a fluid pressure relay valve, more particularly, to such a valve for the electro-pneumatic control of vehicle brakes.

It has been known to provide such a fluid pressure relay valve comprising a control chamber one side of which is defined by a piston which actuates inlet and outlet valves for controlling the action of the pressure medium in a valve chamber which is connected to a braking device or some other device which is to be operated. The pressure within the chamber is controlled as a function of control pressure supplied into a control chamber. The pressure in the control chamber is controlled by solenoid inlet and outlet valves.

Electro-pneumatic systems including blocking devices such as brakes have the inherent disadvantage of considerable undercontrol. Undercontrol occurs because of a lag in response of the braking valve after a signal has been released to lower the pressure in a brake cylinder wherein the brake cylinder pressure is decreased to a level lower than that contemplated. This lower level of pressure is actually a loss in pressure and results in a longer braking distance i.e., distance in which a braked vehicle is stopped, because of this braking power.

It is therefore the principal object of the present invention to provide a novel and improved fluid pressure relay valve which avoids the undercontrol of control pressure.

It is a further object of the present invention to provide such a fluid pressure relay valve particularly for electro-pneumatic control of vehicle brakes wherein excessive lowering of the pressure in the brake cylinder is avoided subsequent to the release of a "hold the pressure" signal and the brake is released only to the extent as indicated by a control signal for ending the decrease of pressure.

According to one aspect of the present invention a fluid pressure relay valve for the electro-pneumatic control of vehicle brakes may comprise a housing having a control chamber therein with the pressure in the control chamber being controlled by inlet and outlet solenoid valves. A piston is displaceable within the control chamber and defines one wall of the control chamber. There is a second chamber on the other side of the piston and connected to a braking device. First and second valve means are actuable by the piston for controlling the pressure in the second chamber by venting the pressure from the chamber and for connecting the chamber to a source of pressure medium. Connected to the control chamber is an additional volume of pressure medium for the purpose of increasing the pressure in the control chamber to a predetermined level by a regulated lowering of the pressure in the additional volume subsequent to a "hold the pressure" signal. The lowering of pressure in the additional volume may be accomplished by a throttle valve or a check valve. The decrease in pressure in the additional volume is preferably regulated by the control pressure, which is the pressure in the control chamber. The pressure can also be lowered by being controlled by the pressure of the brake cylinder. The level of pressure to which the pressure of the control chamber is raised is determined by the pressure in the control chamber and the pressure in the additional volume upon release of the "hold the pressure" signal.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
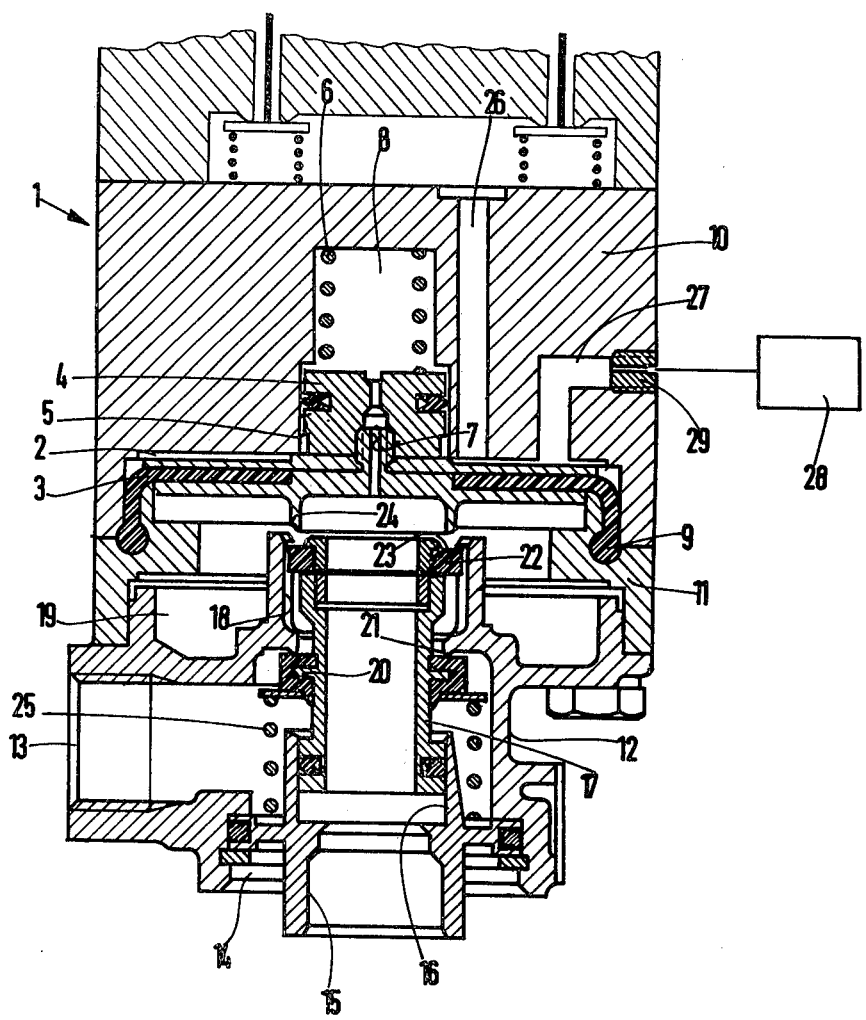
FIG. 1 is a sectional view through a relay valve of the present invention comprising a throttle between the additional volume and the control chamber.

As may be seen in FIG. 1, the fluid pressure relay valve of the present invention comprises a housing 1 in which there is provided a control chamber 2 a surface of which is formed by a control piston 3 which is guided for displacement within the control chamber by means of a central extension 4 slidably received within a recess 5. A spring 6 acts upon the extension 4 to load the extension. A space 8 is formed in the housing 1 above the extension 4. Pressure within the space 8 is exhausted through a bore 7 passing through extension 4 and through the piston 3.

In this particular embodiment the control piston 3 comprises a flexible diaphragm having a reinforced bead or edge 9 which is clamped in grooves between a housing part 10 in which the control chamber 2 is formed and a central annular housing element 11.

Attached to the underside of the annular housing element 11 is another housing component 12 which is provided with a connection 13 leading to an air reservoir as a source of pressure medium and also provided with a central opening 14 in which is positioned a tubular insert 15. The insert 15 has an inner tubular section 16 within which is slidably received and sealed against pressure losses a tubular valve element 17 which is displaceable in the axial direction of the tubular insert 16 and extends through a central opening 18. The opening 18 provides for communication between connection 13 and a chamber 19 which is defined on one end thereof by the piston 3 and on the other end thereof by the annular housing element 11 and housing part 12.

While not shown in the drawing, there is a connection from chamber 19 to the brake cylinder which also is not shown.

The valve element 17 has a central external flange upon which is mounted a packing ring 20 which together with a valve seat 21 formed on the housing part 12 defines a first valve 20,21. In its closed position this valve closes the connection from the air reservoir through connection 13 to chamber 19.

On the end of the valve element 17 facing the piston 3 a packing ring 22 is inserted in a groove to define a valve surface 23 which coacts with a valve seat 24 to define a second valve 23,24. When this second valve is open, the chamber 19 is vented to the atmosphere through the hollow valve element 17 and the tubular insert 15 and, as a result, the brake cylinder connected to the chamber 19 is also evacuated.

A spring 25 has one end resting on a portion of the tubular insert 15 and the other end acts upon a flange or shoulder on the valve element 17 so as to load the valve element in the closing direction of valve 20,21. When valve 23,24 is closed, the piston 3 will continue to act against the valve element 17 to open valve 20,21.

The control chamber 2 is connected through a passage 26 in the housing component 10 to a component which is not shown in the drawings but can be connected into a unit with the relay valve and in which there are provided two solenoid valves. A solenoid inlet valve supplies air into the control chamber at a control pressure and a solenoid outlet valve evacuates the control chamber.

When a signal "lower the pressure of the brake cylinder" is emitted by, for example, an anti-skid control device, the solenoid outlet valve will be opened to evacuate the control chamber through passage 26 and the open solenoid outlet valve. The solenoid inlet valve will remain closed during this operation.

When a signal "increase brake cylinder pressure" is emitted, the solenoid inlet valve will be opened while the solenoid outlet valve will be closed. Through the open inlet valve, compressed air will be introduced into the control chamber from a reservoir that is not shown in the drawing and through a brake valve of the motor vehicle, the brake valve also not being shown and may flow through nozzle 29 into the volume 28. In this manner, the volume 28 will always be refilled during normal braking conditions.

The control chamber 2 is connected through a passage 27 in the housing part 10 to an additional volume 28 and a nozzle 29 is inserted into the passage 27.

Figure 3:
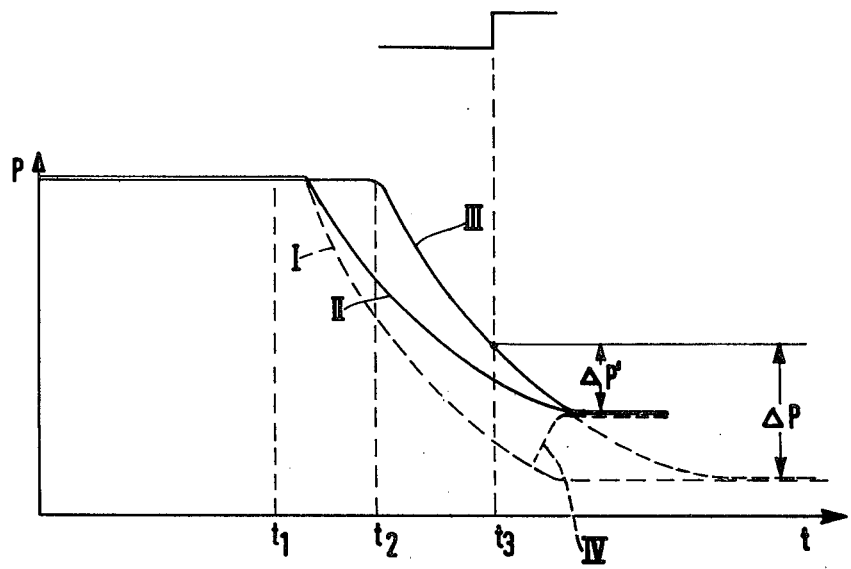
FIGS. 3 and 4 are graphs showing the relationship of pressure with respect to time for clarifying the description of the operation of the relay valves of FIGS. 1 and 2, respectively.

If the solenoid outlet valve should be opened at a time $t_1$ in response to a signal "lower the pressure" the pressure P in control chamber 2 after a certain lag or delay would drop along a curve I shown with a dashed line in the diagram of FIG. 3, if an additional volume 28 is not provided. At time $t_2$, valve 23,24 is opened for venting the brake cylinder simultaneously with closing of valve 20,21. This lowering of pressure in the brake cylinder is illustrated by the curve III in FIG. 3.

At a time $t_3$, a signal "hold the pressure" is released. There is a short lapse of time prior to the closing of the solenoid outlet valve during which time the lowering of the control pressure in chamber 2 continues until a constant control pressure is established. In the absence of the additional volume 28, the pressure of the brake cylinder would drop to a pressure corresponding to the constant control pressure as shown by that portion of curve III drawn in a dashed line.

A further lowering of the pressure in the brake cylinder is stopped by the closing of valve 23,24 under the action of spring 6 only when the same pressure is established on both sides of the piston 3. The pressure difference $\Delta P$ between the required or designed reference pressure of the brake cylinder at time $t_3$ and the pressure as actually obtained in the brake cylinder is designated here as undercontrol.

It is apparent that the longer the delay to the opening of valve 23,24 and the closing of valve 20,21 subsequently to the release of the signal "lower the pressure," then the greater will be the undercontrol $\Delta P$.

By controlling the connection of the additional volume 28 to the control chamber 2, according to the present invention the undercontrol may be established at a substantially lower value of $\Delta P'$. When the control chamber 2 is evacuated in order to lower the control pressure therein, compressed air flows from additional volume 28 through nozzle 29 into the control chamber 2 so that the pressure in the additional volume 28 is throttled and decreases along the curve II while the pressure in the control chamber 2 remains substantially unthrottled along the curve I. As a result, subsequently to the signal "hold the pressure" a mixed pressure indicated at IV is established in the control chamber 2 and this mixed pressure is higher than the control pressure would be without the connection of the additional volume 28. Thus, there is obtained an undercontrol $\Delta P'$ which is substantially less than the undercontrol $\Delta P$ as obtained without the additional volume. Accordingly, the pressure within the brake cylinder is maintained at a higher level adapted to the required pressure at the time $t_3$. This means that a considerable quantity of pressure of compressed air is saved and the braking force will drop below the required or desired valve to a very small extent which can be adjusted. It is therefore apparent that the undercontrol $\Delta P'$ is a function of the pressure in the control chamber and the pressure in the additional volume after the release of the signal "hold the pressure."

It is further pointed out that the greater the magnitude of the additional volume 28 the higher will be the level of the resulting mixture of pressures in the control chamber and additional volume. Also, the better the adaptation of the pressure curve in the additional volume to the drop of pressure in the brake cylinder the smaller will be the undercontrol. The pressure curve in the additional volume can be adapted to the pressure drop in the brake cylinder by a suitable selection of the nozzle 29 in the case of a large additional volume. The limits of such additional volume are determined on one hand by the cross-sectional area of the outlet of the solenoid outlet valve which is open to lower the pressure in the control chamber and on the other hand by the portion of the total volume which is still effective. The conditions can be readily established in such a manner that only a very low undercontrol is obtained and this undercontrol may be only slightly below the pressure of the brake cylinder subsequent to the release of the signal "hold the pressure." A certain overcontrol may be of interest in particular applications.

It is therefore apparent from the above described embodiment of the invention that the object of the invention is obtained when the mixture of pressures is obtained in the fastest possible time and this will occur when the additional volume is relatively large.

Figure 2:
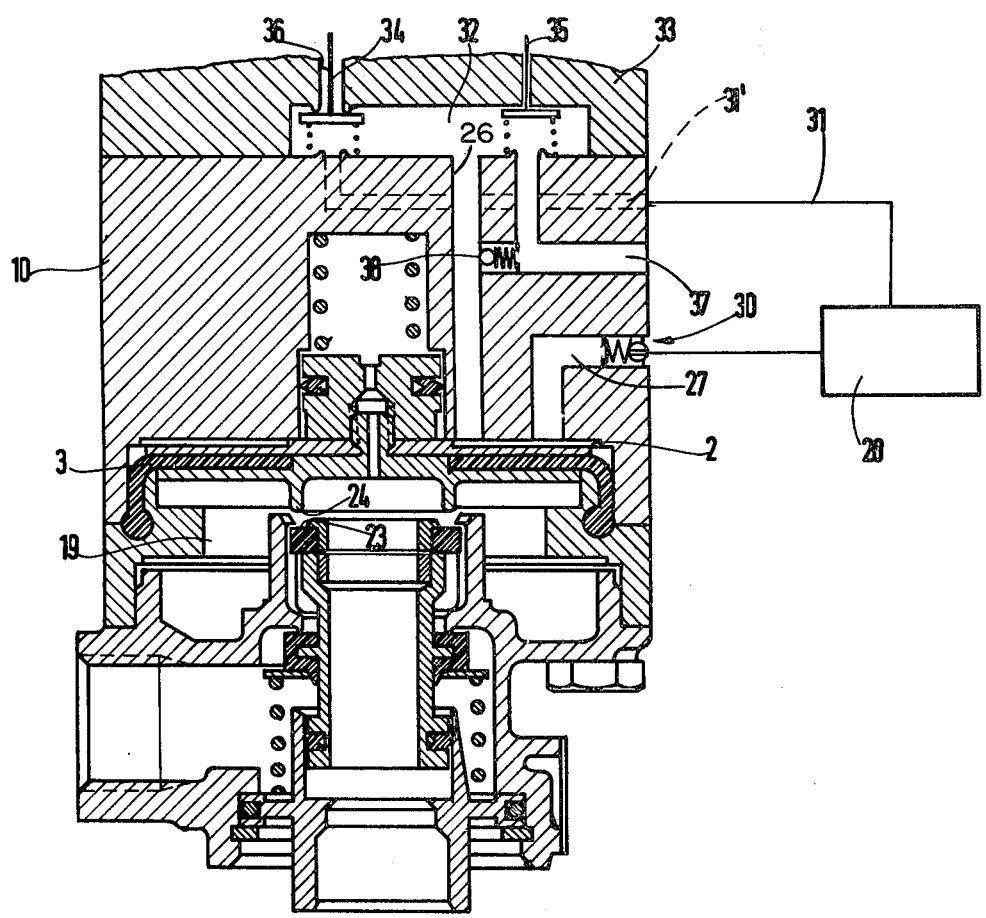
FIG. 2 is a view similar to that of FIG. 1 but of a modification of the relay valve wherein a throttle check valve is provided between the additional volume and the control chamber.

The modification of the relay valve as shown in FIG. 2 has a structure and operation which correspond generally to the relay valve of FIG. 1 as described above. Accordingly, the description of the valve of FIG. 2 can be limited to the essential differences therebetween.

As in FIG. 1, additional volume 28 is connected to control chamber 2 through a passage 27 in which there is installed a throttle check valve 30 indicated in the drawing by a schematic representation of a spring resting on fixed abutments in passage 27 and urging a spherical valve element having a bore therethrough against a valve seat in the passage 27. After a controlled lowering of pressure, the throttle check valve 30 opens after the pressure in the control chamber has been lowered rapidly to a predetermined value as a result of which an unthrottled drop of pressure occurs between the additional volume 28 and the control chamber 2. Additional volume 28 is connected through a pipe 31 and a passage 31' to a passage 32 in a component 33 flanged onto housing part 10 of the relay valve for the purpose of having mounted therein solenoid inlet and outlet valves 34 and 35. The passage 32 also communicates with the passage 26 to the control chamber 2 as described with the relay valve in FIG. 1.

The outlet valve 34 is mounted in a venting passage 36 which is used for evacuating or venting control chamber 2 via the passages 26 and 32. To vent the control chamber, the solenoid outlet valve 34 is switched from its closed position as shown in FIG. 2 into a position to close off passages 31,31' from duct 32. At the same time, solenoid inlet valve 35 is switched from its open position to its closed position (as shown in the drawing to close off the charging passage 37 from passage 32). In order to admit compressed air into the control chamber 2 via passages 37, 32 and 26, solenoid inlet valve 35 is opened and outlet valve 34 is moved in position to close venting passage 36. The compressed air then flows to the control chamber 2 through the brake valve of the motor vehicle (which valve is not illustrated) and through passages 37, 32 and 26. At the same time, there will occur an unthrottled equalization of pressure with the additional volume through passages 31 and 32.

Figure 4:
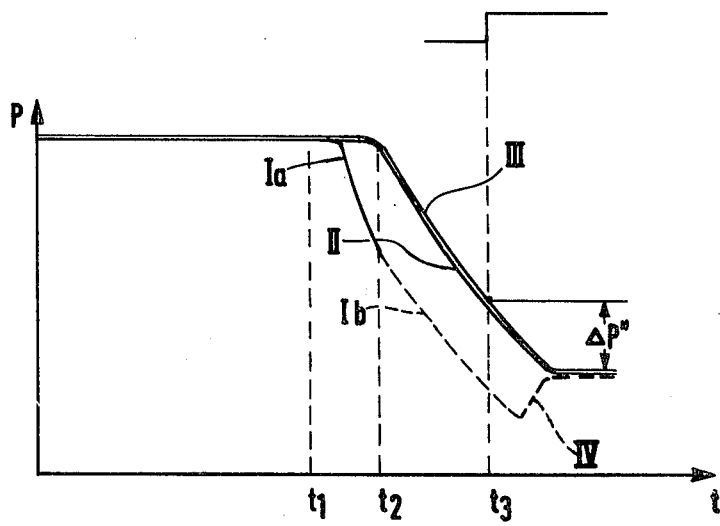

The diagram of FIG. 4 illustrates the pressure characteristics of the relay valve of FIG. 2 on lowering of pressure and subsequent maintaining of pressure after the emission of the corresponding signals. If a signal for lowering the pressure of the brake cylinder is released at time $t_1$, outlet valve 34 will open exhaust passage 36 and will shut off passage 31. The relatively smaller volume of the control chamber 2 is rapidly exhausted unthrottled through ducts 26,32, and 26 until time $t_2$ according to the curve Ia. The pressure difference thus attained with respect to the brake cylinder pressure in chamber 19 will bring about a rapid reaction of piston 3 to open valve 23,24 as a result of which the brake cylinder will be exhausted in accordance with curve III. Further exhausting of the control chamber until the release of the signal "hold the pressure" at time $t_3$ will then drop off along the curve Ib shown in a dashed line.

When pressure is reduced at the time $t_2$, the pressure in the control chamber is already lowered to such an extent that the closing force of check valve 30 is overcome and compressed air from the additional volume 28 is rapidly introduced and, at this particular time, largely unthrottled into control chamber 2. The decrease of pressure in the additional volume 28 is indicated by the curve II. After release of a "hold the pressure" signal, an undercontrol $\Delta P''$ is attained by means of a rapid equalization of pressures in the control chamber 2 and the additional volume 28 by means of pipe 31, passage 31', solenoid outlet valve 34 (in the position shutting off passage 36 and releasing the connection between passages 31' and 32) passage 32 and the passage leading to control chamber 32. The magnitude of such undercontrol is even less than the undercontrol of FIG. 3. The mixture or equalization of pressure thus obtained in the control chamber 2 is designated at IV.

An important feature of the relay valve of FIG. 2 is the effect of check valve 30 which provides the possibility of a rapid reaction of piston 3 and, at a relatively small additional volume, extensive adaptation of the pressure curve of the lowered pressure of the control chamber to the pressure of the brake cylinder in order to obtain a small undercontrol. It is thus possible to obtain an undercontrol which is only slightly less than the required pressure in the brake cylinder at the time $t_3$ at the release of the signal "hold the pressure." Because of the throttle valve in the check valve 30, the pressure in the additional volume is decreased on release of the "hold the pressure" signal at a time when the pressure in the control chamber has already been decreased to zero so that a reduced overcontrol is obtained. However, such an unavoidable overcontrol can be readily limited to a level at which the valve for exhausting the brake cylinder no longer reacts.

Since it is advantageous that at the time $t_2$ there is a relatively large pressure difference between the pressure in the control chamber and the pressure in the additional volume in order to provide for a quick action of the check valve, such a pressure difference should not be too great at the time $t_3$ in order to avoid an overcontrol. Such overcontrol may lead to the reaction of the valve. The throttle connection of the check valve may be replaced by a connection to a piston by means of a piston rod which is not shown in the drawings and which is subjected advantageously to the control pressure for the purpose of controlling a pressure responsive hold-back effect of the check valve. As a result, it is possible to control in a particular and predetermined manner the lowering of pressure in the additional volume.

It is pointed out that the additional volume 28 may be constructed integrally with the housing of the relay valve. If a hold-back effect in accordance with the modification of FIG. 2 is not required for a faster reaction of the check valve, the throttle check valve of FIG. 2 may be replaced by a throttle valve as shown in FIG. 1. A check valve 38 may also be advantageously employed in a passage between conduit 37 and passage 26 in order to achieve a rapid braking action.

The use of the check valve in the connection between the additional volume and the control chamber permits achieving the rapid introduction of compressed air into the control chamber after a partial rapid decrease of the control pressure by the use of a relatively small additional volume. The pressure equalization between the additional volume and the control chamber is brought about through an unthrottled passage. The check valve produces not only a faster establishing of the mixed or equalized pressure through the absence of a nozzle in the passage leading to the control chamber but also permits the formation of a higher mixed pressure because of the hold-back effect of the check valve.

The cross-sectional area of the solenoid outlet valve 36 may be determined in such a manner that a particular venting curve or characteristic is obtained on venting the total volume produced from the additional volume and the control chamber volume. This initially produces a rapid exhausting of the relatively small control chamber through the cross-sectional area of the solenoid outlet valve on appearance of a "hold the pressure" signal. As a result, the required pressure difference between the control pressure and the brake cylinder pressure is obtained rapidly and this in turn produces a very small lapse of time for the connection.

The use of a throttle check valve is advantageous that in the case of a high hold-back effect of the check valve an overcontrol in the lower pressure range may be avoided or kept at a low level. In place of a throttle check valve there can also be used a check valve controlled by the control pressure with its hold-back effect being controlled not only by a certain force of a spring but also additionally or solely by the pressure of a pressure medium and preferably by the pressure in the control chamber. For this purpose, the check valve may be connected to a piston in a chamber which is subjected to the control pressure.

Thus it can be seen that the present invention has disclosed a fluid pressure relay valve wherein the magnitude of undercontrol is significantly reduced. Further, this reduction is achieved by a relatively simple structure which is capable of reliable operation over long periods of time.

It will be understood that this invention is susceptible to modification in order to adapt it to different usages and conditions, and accordingly, it is desired to comprehend such modifications within this invention as may fall within the scope of appended claims.

What is claimed is:

1. A fluid pressure relay valve for the electro-pneumatic control of vehicle brakes comprising a housing having a control chamber therein, inlet and outlet solenoid valve means connected to said control chamber for controlling the control pressure therein, a piston displaceable within said control chamber and defining one wall of said control chamber, there being a second chamber on the other side of said piston connected to a braking device, first and second valve means actuable by said piston for venting said second chamber and for connecting said second chamber to a source of pressure medium, and means defining an additional volume of pressure medium connected to said control chamber for increasing the pressure in said control chamber to a predetermined level by a lowering of the pressure in said additional volume means subsequently to a "hold the pressure" signal.

2. A fluid pressure relay valve as claimed in claim 1 and means in the connection of said additional volume means to said control chamber for regulating the decrease of pressure in said additional volume means.

3. A fluid pressure relay valve as claimed in claim 1 and means for regulating the drop of pressure in said additional volume means by the pressure in said control chamber.

4. A fluid pressure relay valve as claimed in claim 2 wherein said regulating means comprises a throttle valve.

5. A fluid pressure relay valve as claimed in claim 2 wherein said regulating means comprises a check valve which is opened at a predetermined reduced pressure in said control chamber, and unthrottled connection between said additional volume means and said control chamber and controlled by said solenoid outlet valve.

6. A fluid pressure relay valve as claimed in claim 5 wherein the cross-sectional area of said solenoid outlet valve is dependent upon the characteristic curve between the volume of said control chamber and the volume of said additional volume means.

7. A fluid pressure relay valve as claimed in claim 5 wherein said check valve comprises a throttle check valve.

8. A fluid pressure relay valve as claimed in claim 5 wherein the closing force of said check valve is overcome by the pressure in said control chamber.

* * * * *